United States Patent
Miyazaki

[11] Patent Number: 5,863,136
[45] Date of Patent: Jan. 26, 1999

[54] METHOD OF REDUCING AXIAL RUNOUT OF A ROLLING BEARING UNIT AND A ROLLING BEARING UNIT IN WHICH AXIAL RUNOUT HAS BEEN REDUCED

[75] Inventor: Seizo Miyazaki, Fujisawa, Japan

[73] Assignee: NSK Ltd., Tokyo, Japan

[21] Appl. No.: 923,226

[22] Filed: Sep. 4, 1997

[30] Foreign Application Priority Data

Sep. 4, 1996 [JP] Japan .................................. 8-234463

[51] Int. Cl.[6] .................................................. F16L 19/28
[52] U.S. Cl. .......................... 384/512; 384/448; 384/500
[58] Field of Search .................................... 384/512, 513, 384/500, 517, 518, 448

[56] References Cited

U.S. PATENT DOCUMENTS

| | | | |
|---|---|---|---|
| 4,395,077 | 7/1983 | Wong | 384/518 X |
| 4,900,958 | 2/1990 | Kitahara et al. | 384/517 X |
| 5,036,235 | 7/1991 | Kleckner | 384/133 X |
| 5,599,111 | 2/1997 | Miyazaki et al. | 384/513 X |

*Primary Examiner*—Thomas R. Hannon
*Attorney, Agent, or Firm*—Helfgott & Karas, PC

[57] ABSTRACT

The center of rotation of a shaft 2 with inner rings 11*a* externally secured thereto, is made concentric with the geometric center to thereby prevent the occurrence of runout during high speed rotation. To achieve this, the axial runout of the end portion of the shaft 2 is detected by a displacement sensor 23 while the shaft 2 is rotating. Then based on the measurement results, a portion of the shaft 2 is heated by a laser projector 24 to produce a structural change in this portion, thereby slightly bending the shaft 2. The center of rotation of the shaft 2 is thus made to coincide with the geometric center as a result of the bending.

2 Claims, 9 Drawing Sheets

METHOD OF REDUCING AXIAL RUNOUT OF A ROLLING BEARING UNIT AND A ROLLING BEARING UNIT IN WHICH AXIAL RUNOUT HAS BEEN REDUCED

FIELD OF THE INVENTION

The present invention relates to improvements in rolling bearing units assembled into the various precision rotating parts, for example, into spindle motors, rotary actuators, rotary encoders and the like for video tape recorders (VTR), hard disk drives (HDD), laser beam printers (LBP) for supporting the rotating parts.

DESCRIPTION OF THE RELATED ART

Ball bearings are used in order to support the spindle of a VTR or HDD so as to rotate freely while preventing whirling motion (motion perpendicular to the axis) and axial vibration. Conventionally used are a pair of ball bearings (deep groove or angular type) which are independent of each other. Moreover in order to improve the efficiency of the operation of assembling the ball bearing into the rotational support portion, a double row ball bearing can be used.

Figure 5A:
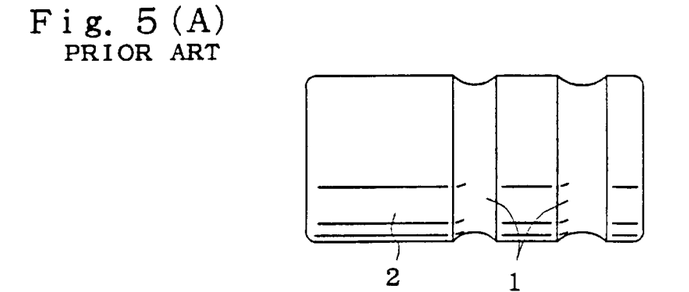
FIGS. 5(A), 5(B) and 5(C) are a cross-sectional view illustrating the parts and finished product of a first example of a conventional ball bearing.
Figure 5B:
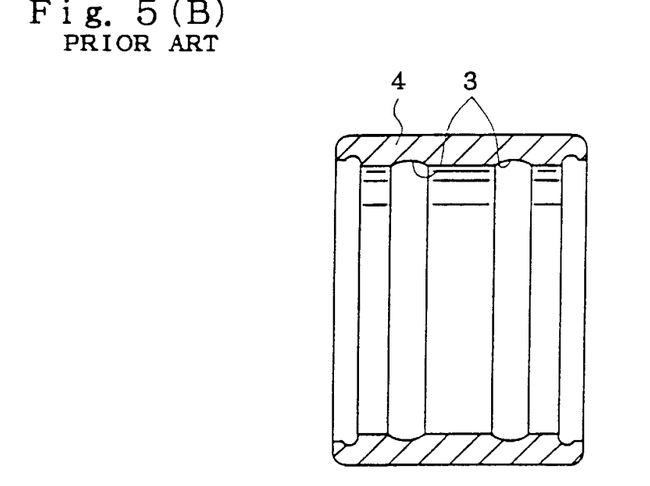
Figure 5C:
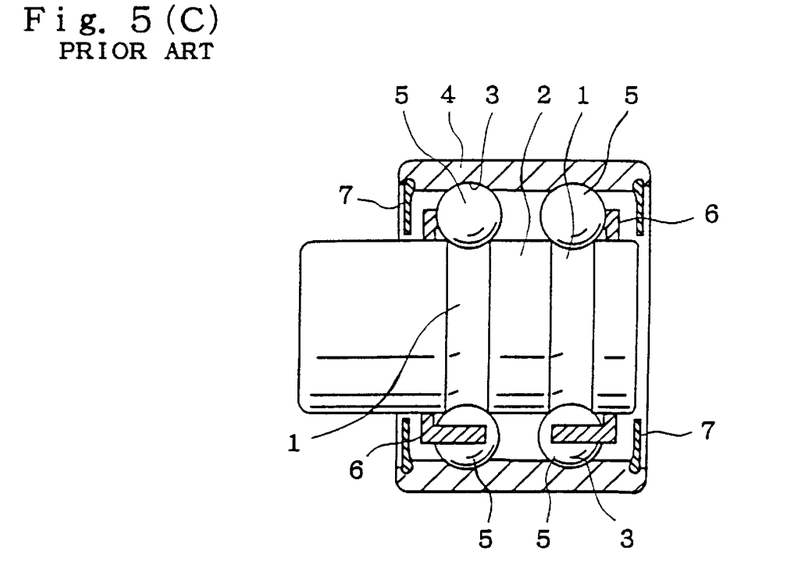

A double row ball bearing is constructed to have a shaft 2 as shown in FIG. 5 (A) having a pair of deep groove inner ring raceways 1 on an outer peripheral surface thereof, an outer ring 4 as shown in FIG. 5 (B) having a pair of deep groove outer ring raceways 3 on an inner peripheral surface thereof, which are assembled together concentrically as shown in FIG. 5 (C), and a plurality of balls 5 which are installed between the inner ring raceways 1 and the outer ring raceways 3 so as to be freely rotatable therebetween. Cages or retainers 6 in FIG. 5 (C) are provided for retaining the balls 5 at an even spacing around the circumference of the raceways 1 and 3, while seals 7 are provided for preventing the ingress of foreign matter to the region of the balls 5 between the raceways 1 and 3.

The ball bearing of the double row deep groove type as shown in FIG. 5 (C), is of a conventionally known construction. However such a ball bearing which can support the spindle of a VTR or HDD has heretofore been difficult in construction. This is due to the following reasons.

Ball bearings for supporting the spindle of a VTR or HDD must be of an extremely high accuracy in order to prevent whirling motion and axial vibration. Therefore, such ball bearings for supporting the spindle are used in a pre-load condition.

Figure 6:
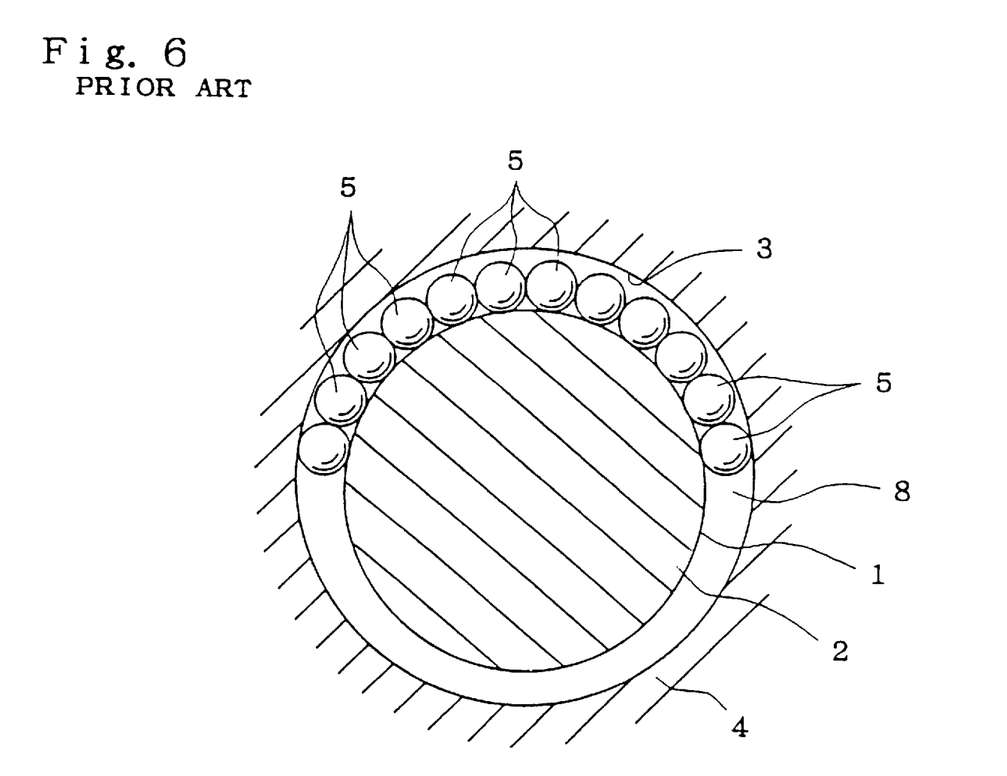
FIG. 6 is a cross-sectional partial view for illustrating a condition where an outer ring race and an inner ring race are offset for inserting the balls.

On the other hand, when the balls 5 are installed between the inner ring raceways 1 and the outer ring raceways 3 in order to assemble a deep groove type ball bearing, then as shown in FIG. 6, the inner ring raceways 1 and the outer ring raceways 3 are offset, so that a portion of a circumferential gap 8 between the two raceways 1 and 3 is widened. A predetermined number of balls 5 are then inserted between the inner ring raceways 1 and the outer ring raceways 3 from the widened portion of the gap 8. After this, the inner ring raceways 1 and the outer ring raceways 3 are made concentric, and the predetermined number of balls 5 are arranged at even spacing around the circumference of the raceways 1, 3.

When the plurality of balls 5 which are inserted in this way all together at one portion around the circumference of the raceways 1 and 3 are relocated to give an even spacing around the circumference, the balls 5 must be slid relative to the inner ring raceways 1 and the outer ring raceways 3. At this time, the inner ring raceways 1 and the outer ring raceways 3 press hard against the balls 5 (to give a pre-load condition), and hence the rolling surface of the inner ring raceways 1, the outer ring raceways 3 and the balls 5 are easily damaged. In the case of damage, then various problems arise such as vibration during rotation, or a loss in durability.

In addition to the abovementioned first example of a conventional construction for a pre-loaded ball bearing, several other constructions are also known. However, there are problems such as difficulty with miniaturization due to the large number of components, or difficulty with the assembly operation, and in that sufficient rotational accuracy cannot be obtained. There is therefore at present no ball bearing which gives ideal performance when assembled into precision rotating parts such as used in a HDD.

As an alternative to the above arrangement, Japanese Patent First Publication KOKAI Nos. H6-221326 and H6-344233 disclose a ball bearing as shown in FIGS. 7(A) to 7(D) which overcomes the abovementioned problems. A shaft 9 constituting the ball bearing of a second example of a conventional construction, has a smaller diameter portion 9a and a larger diameter portion 9b connected by a step portion 9c as shown in FIG. 7 (A), with a first inner ring raceway 10 of the deep groove type formed on an outer peripheral surface of the larger diameter portion 9b. Furthermore, an inner ring 11 has a second inner ring raceway 12 of the deep groove type formed in an outer peripheral surface thereof.

When making up such a ball bearing including the shaft 9 and the inner ring 11, then in a first step as shown in FIG. 7 (B), the inner ring 11 is externally fitted over the smaller diameter portion 9a of the shaft 9 so as to have a sufficient engaging strength (a strength such that there is no slipping movement due to a reaction force of a pre-load). Consequently, an inner diameter dimension R11 (FIG. 7 (A)) of the inner ring 11 in a free condition is made slightly smaller than an outer diameter dimension D9a (FIG. 7 (A)) of the smaller diameter portion 9a similarly in the free condition (R11<D9a). With the inner ring 11 externally fitted to the smaller diameter portion 9a in the above manner, then a pitch P1 between the first inner ring raceway 10 on the outer peripheral surface of the larger diameter portion 9b and the second inner ring raceway 12 on the outer peripheral surface of the inner ring 11 is made longer than a pitch p1 (FIG. 7 (D)) necessary for applying a predetermined pre-load to the ball bearing after assembly (P1>p1).

Figure 7A:
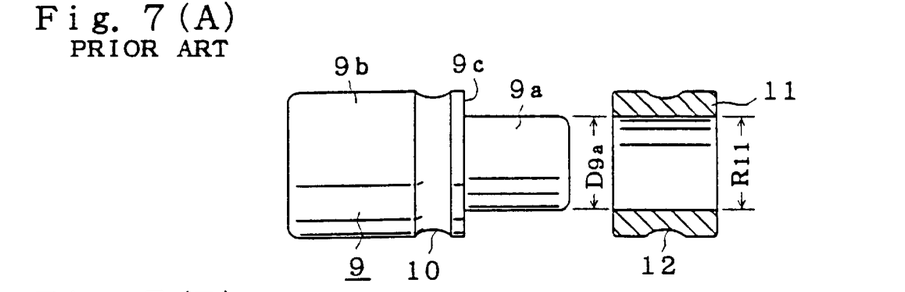
FIGS. 7(A), 7(B), 7(C) and 7(D) are a cross-sectional view showing the steps in manufacturing a second example of a conventional ball bearing.
Figure 7B:
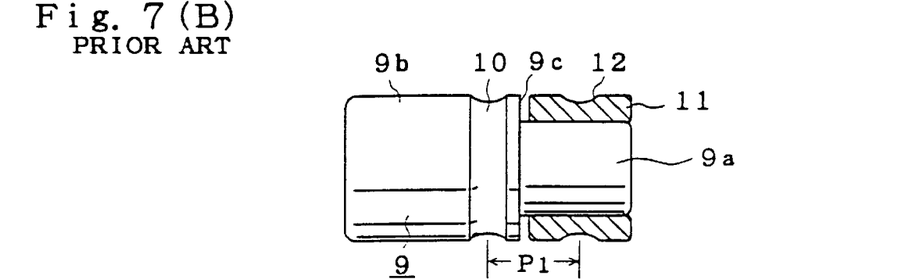

Then in a second step, the shaft 9 and the inner ring 11 assembled in the first step are inserted inside a cylindrical outer ring 13. On the inner peripheral surface of the outer ring 13 is formed a pair of outer ring raceways 14 of the deep groove type. With the second step, the pair of outer ring raceways 14 are arranged opposite to the first and second inner ring raceways 10, 12.

Then in a third step, the shaft 9 and the inner ring 11 are made eccentric to the outer ring 13, so that as shown in FIG. 6, a circumferential gap 8 between the pair of outer ring raceways 14 and the first and second inner ring raceways 10, 12 is widened at one portion. A predetermined number of balls 5 are then inserted into the gap 8 from the widened portion.

Figure 7C:
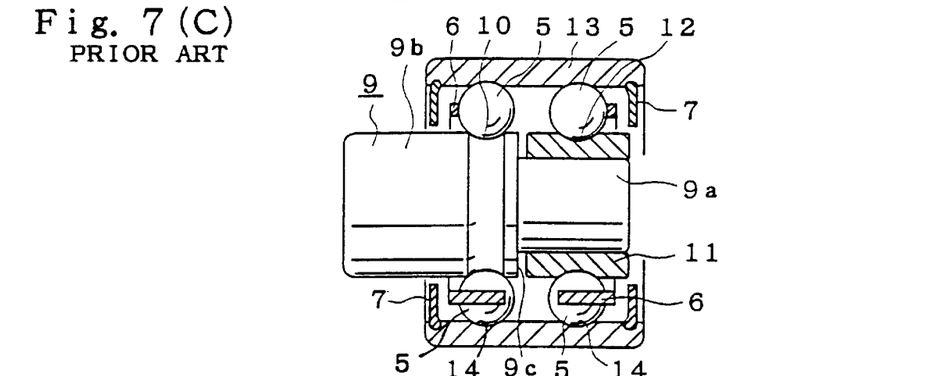

After this in a fourth step, the shaft 9 and the inner ring 11 are made concentric with the outer ring 13 while circumferentially moving the predetermined number of balls 5 inserted into the gap 8 between the pair of outer raceways 14 and the first and second inner raceways 10, 12, so that the balls 5 are disposed evenly around the circumference. After this, as shown in FIG. 7 (C), retainers 6 are fitted to each ball row so that the balls 5 are kept at an even circumferential spacing. Moreover as required, seals 7 are fitted to the inner peripheral surfaces on opposite ends of the outer ring 13. In this condition, a pre-load has not yet been applied to the balls 5.

Figure 7D:
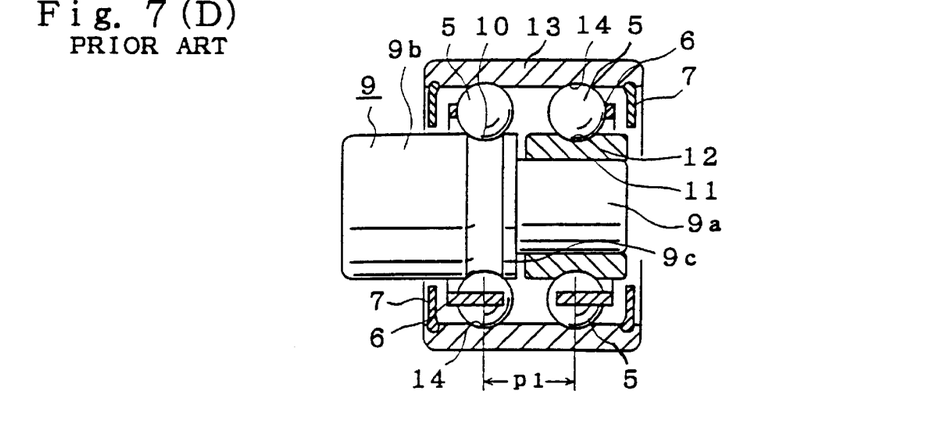

Then in a final fifth step, the pitch of the first and second inner raceways 10, 12 is shortened by moving the inner ring 11 in an axial direction (to the left in FIG. 7) on the outer peripheral surface of the shaft 9 towards the step portion 9c, to give as shown in FIG. 7(D), the pitch p1 necessary for applying the predetermined pre-load. In this condition, a predetermined pre-load is applied to the plurality of balls 5 thus giving a completed pre-loaded ball bearing. Also when completed, there is still a gap between the step portion 9c and the end surface of the inner ring 11.

With the pre-loaded ball bearing obtained as above, a restraining force greater than the axial load counterbalancing the pre-load acts between the inner peripheral surface of the inner ring 11 and the outer peripheral surface of the smaller diameter portion 9a, based on the friction force of the interference fit. Consequently, the inner ring 11 does not move even without applying an adhesive between the shaft 9 and the inner ring 11, and hence the ball bearing can be handled as a single unit with no loss of the applied pre-load. Therefore, the operation of making up the bearing part for the spindle of a VTR or HDD is simplified. Moreover since an axial pre-load is applied, then rotational support for the spindle can be effected to a high accuracy.

Figure 8A:
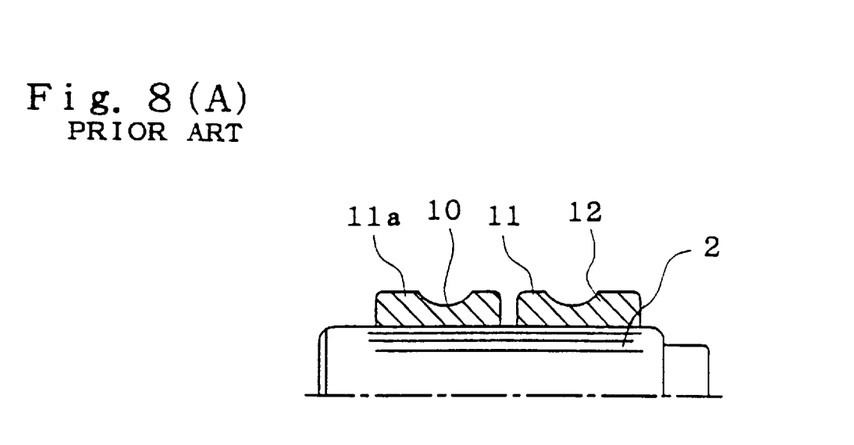
FIGS. 8(A) and 8(B) are a half cross-sectional view showing the steps in manufacturing a third example of a conventional ball bearing.
Figure 8B:
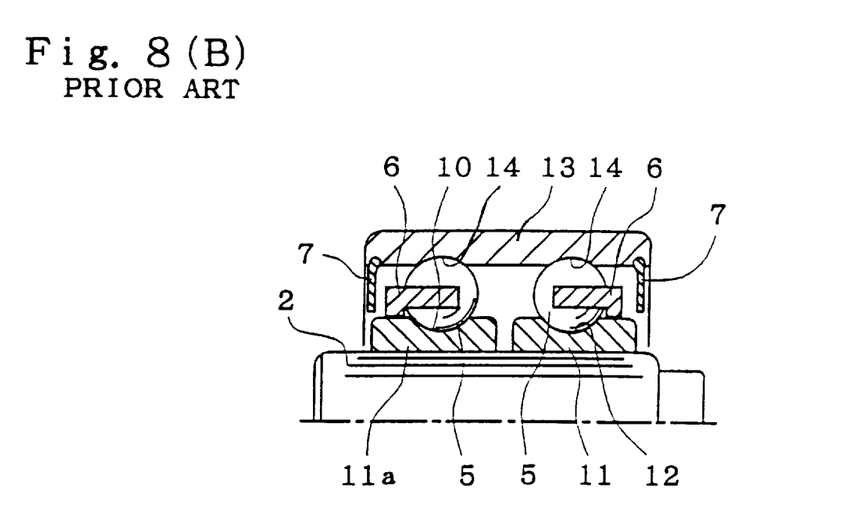

In the case of the second example of the above described conventional construction, the first inner ring raceway 10 is directly formed on the outer peripheral surface of the shaft 9. However as with a third example of a conventional construction shown in FIG. 8, a pair of inner rings 11, 11a may be externally secured to a shaft 2 which does not have an inner ring raceway itself. When the inner rings 11, 11a are provided as a pair in this way, then at the time of pre-loading one or both of the inner rings 11, 11a are displaced.

With the pre-loaded ball bearings having the respective constructions of FIG. 7 and FIG. 8, there is no problem from the point of view of applying an appropriate pre-load to it. However when the shafts 2, 9 are rotated, it is found that there is a situation where a vibration referred to as "runout" is produced. The present inventors have investigated the factors producing this type of vibration, and found this is due to deformation of one or both of the members constituting the portions which are engagingly secured by the interference fit. The present inventors have studied the cause of this deformation, and consider this to be as follows.

For example, in the case of the second example of the conventional construction shown in FIGS. 7(A) to 7(D), when the inner ring 11 is pressed onto the smaller diameter portion 9a of the shaft 9 with the interference fit (the inner ring 11 is moved axially relative to the smaller diameter portion 9a), the outer peripheral surface of the smaller diameter portion 9a and the inner peripheral surface of the inner ring 11 are strongly rubbed together along the axial direction. With this rubbing, an axial stress is applied to the shaft 9 and the inner ring 11. In the case of the second and third examples of the conventional construction shown in FIGS. 7(A) to 7(D) and FIGS. 8(A) and 8(B), the inner rings 11, 11a are externally secured around the shafts 9, 2 by means of the interference fit, and hence even after assembly the axial stress remains as an axial residual stress in the inner rings 11, 11a and the shafts 9, 2. In particular, any axial stress accompanying the rubbing and attributable to an unavoidable error in the dimension or shape, or difference in the amount of lubricant existing between the two peripheral surfaces, or inclination or the like, can become uneven around the circumferential direction. If the degree of unevenness becomes significant, then the distortion perpendicular to the axis of the shafts 9, 2, and the inner raceways 11, 11a due to the axial distortion of one or both of the shafts 9, 2, and the inner raceways 11, 11a, can become large enough to produce runout. In particular, in the case of miniature ball bearings where the inner rings 11, 11a are externally secured to the shafts 9, 12 which are 4 mm or less in outer diameter, there is the likelihood of a problem with runout due to this distortion.

Figure 9:
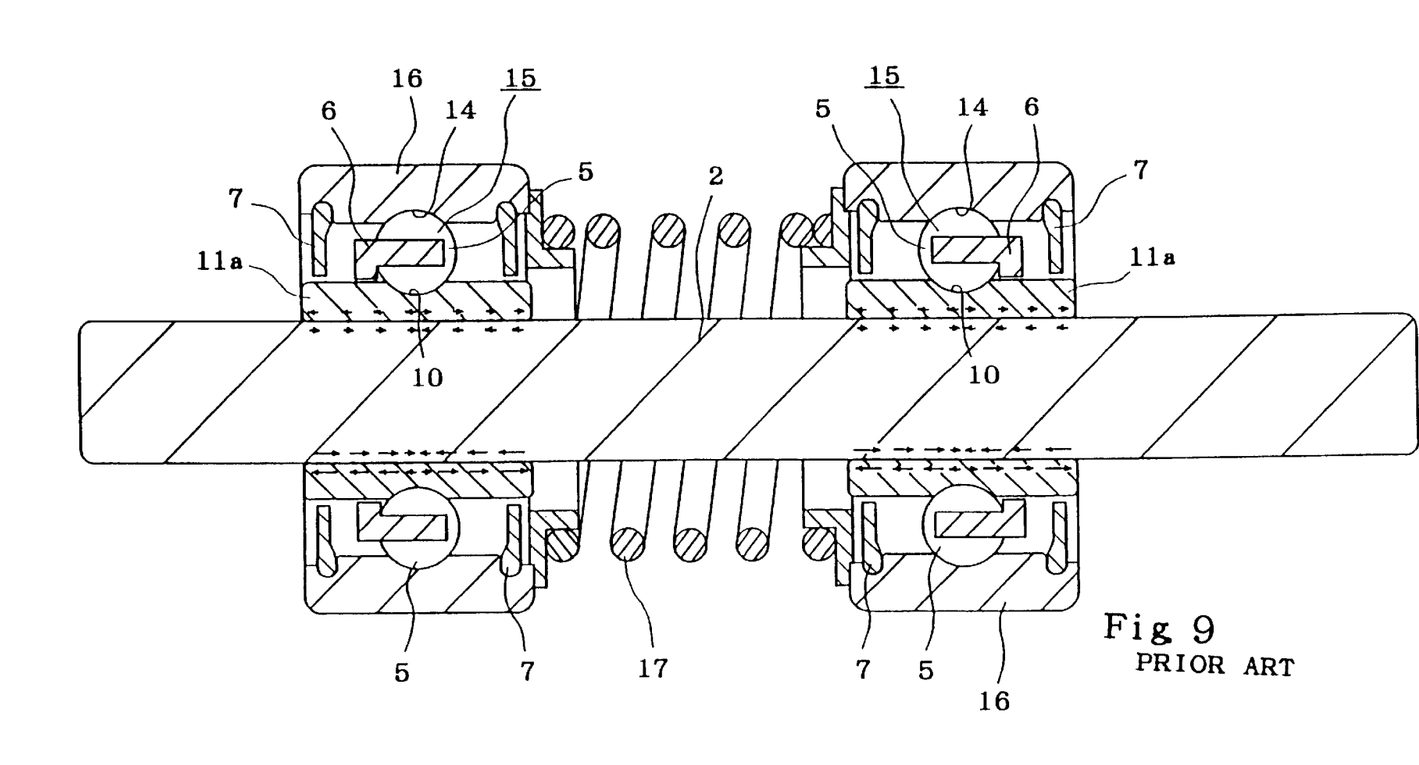
FIG. 9 is a cross-sectional view illustrating a fourth example of a conventional ball bearing.

This type of problem also occurs even with a construction where as shown in FIG. 9, inner rings 11a constituting a pair of ball bearings 15, are externally fitted to a shaft 2, and a pre-load is applied to the ball bearings 15 by providing a spring 17 between a pair of outer rings 16. That is to say, with this fourth example of a conventional construction, the inner rings 11a are externally fitted with an interference fit to the shaft 2 so that the inner rings 11a will not move on the shaft 2 due to the resilient force of the spring 17. Consequently, as with the constructions shown in FIG. 7 and FIG. 8, there is the possibility of a distortion perpendicular to the axis being produced in one or both of the shaft 2 and the inner ring 11a (due to uneven axial distortion around the circumference).

SUMMARY OF THE INVENTION

An object of the present invention is to provide a rolling bearing in which the runout or vibration as mentioned above is reduced.

Another object of the present invention is to provide a method of the reducing the runout or vibration in a rolling bearing.

DESCRIPTION OF THE PREFERRED EMBODIMENTS

The method of reducing runout of a rolling bearing, and a rolling bearing in which axial runout has been reduced, according to the present invention, can be applied to a rolling bearing unit which comprises: a shaft having a cylindrical outer peripheral surface, at least one inner ring externally secured to the outer peripheral surface of the shaft to form an assembly with the shaft, such that a pair of inner ring raceways are formed on an outer peripheral surface of the assembly of the shaft and the inner ring, an outer ring located around the shaft and the inner ring and concentric with the shaft and the inner ring and having an inner peripheral surface formed with an outer ring raceway at locations facing the pair of inner ring raceways, and a plurality of rolling bodies provided so as to be freely rotatable between the outer ring raceways and the inner ring raceways, respectively, with the rolling bodies being subjected to a pre-load. Specifically, in this structure, the shaft assembled into the rolling bearing unit has an end portion which is protruded from the outer ring and inclined to be displaced in the radial direction with rotation of the shaft. This is referred to as "axial runout" in the present specification. According to the present invention, the axial runout is reduced by the steps of measuring the axial runout at the end portion of the shaft while the shaft is being rotated, and based on the measured results, shining a laser beam on the outer peripheral surface of the end portion of the shaft at one portion around the circumference to raise the temperature at the one portion, thereby deforming the one portion, so that the axial runout is reduced by this deformation.

Moreover the rolling bearing unit in which the axial runout has been reduced according to the present invention, comprising: a shaft having an end portion and a cylindrical outer peripheral surface, at least one inner ring externally secured to the outer peripheral surface of the shaft to form an assembly with the shaft, such that a pair of inner ring raceways are formed on an outer peripheral surface of the assembly of the shaft and the inner ring, an outer ring located around the shaft and the inner ring and concentric with the shaft and the inner ring and having an inner peripheral surface formed with an outer ring raceway at locations facing the pair of inner ring raceways, and a plurality of rolling bodies provided so as to be freely rotatable between the outer ring raceways and the inner ring raceways, respectively, wherein the axial runout is reduced by the steps of measuring the axial runout at an end portion of the shaft while the shaft is being rotated, and based on the measured results, shining a laser beam on the outer peripheral surface of the end portion of the shaft at one portion around the circumference to raise the temperature at the one portion, thereby deforming the one portion so that the axial runout is reduced by this deformation.

With the method of reducing the axial runout of a rolling bearing and a rolling bearing in which axial runout has been reduced, according to the present invention constructed as described above, even in the case where the geometric center of the outer peripheral surface of the shaft and the center of rotation of the shaft do not coincide, by deforming the end portion of the shaft a slight amount in the radial direction, then the geometric center can be made to coincide with the center of rotation. Then in this condition where the geometric center is made to coincide with the center of rotation, when the rolling bearing is rotated, the damaging runout is not produced.

Now, the present invention is further detailed referring to the attached drawings.

Figure 1:
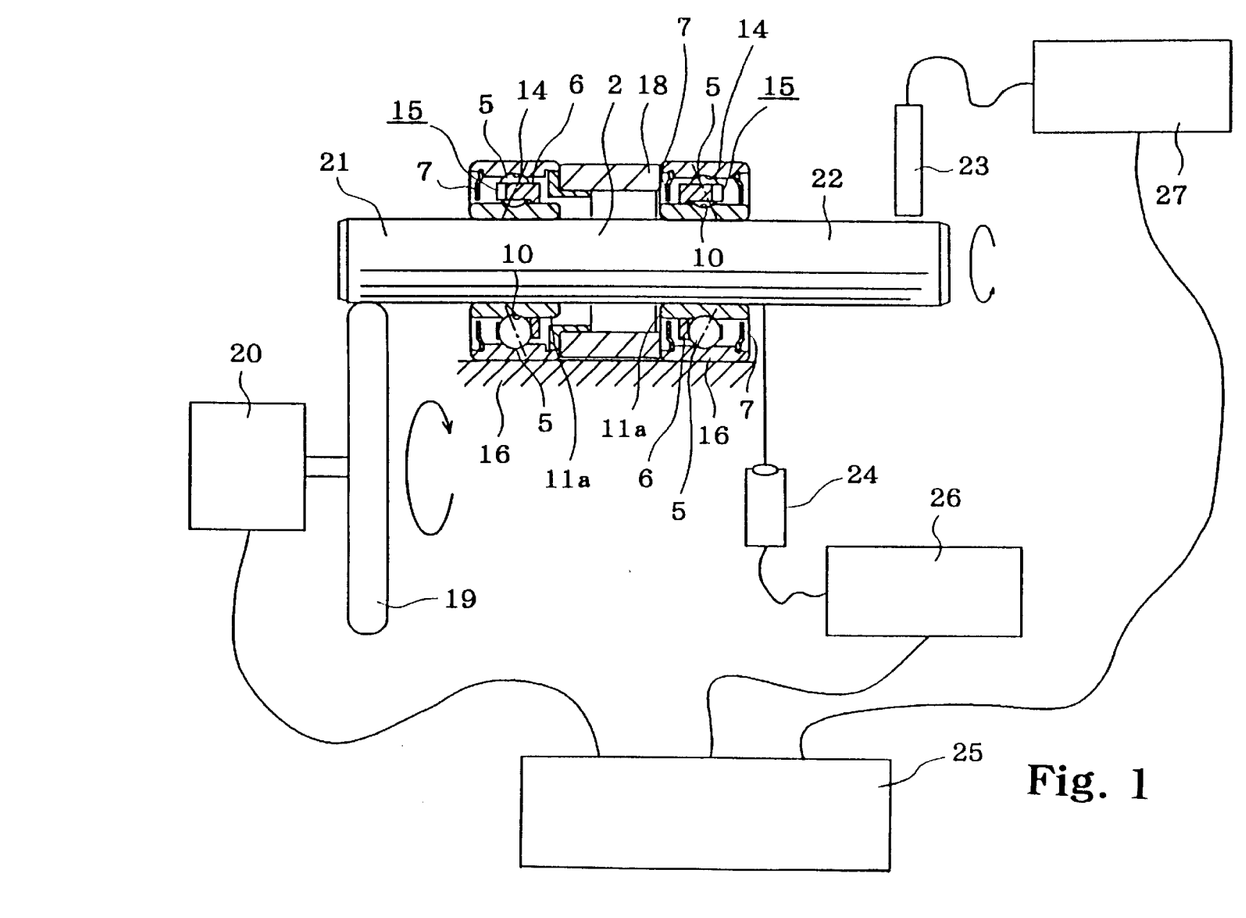
FIG. 1 is a cross-sectional view illustrating a first example of an embodiment of the present invention.

FIG. 1 shows an example of an embodiment of the invention. The rolling bearing unit in which axial runout has been reduced according to the present invention comprises a pair of ball bearings 15 each having inner rings 11a externally fitted to a shaft 2, a pair of outer rings 16, and a cylindrical spacer 18 clamped between the pair of outer rings 16. A desired pre-load is applied to the respective ball bearings 15 by adjusting the location where the inner rings 11a are externally secured to the shaft 2. Opposite ends of the shaft 2 protrude from respective outer end surfaces (end surfaces on the opposite sides to each other) of the inner rings 11a.

An outer peripheral surface of a drive wheel 19 is abutted against one end portion 21 of the shaft 2 (left end portion in FIG. 1), and by means of a drive motor 20, the shaft 2 is rotated at a desired speed through the drive wheel 19. For the drive motor 20, for example a stepping motor may be used so that the shaft 2 is driven intermittently. Preferably, the outer peripheral surface of the drive wheel 19 is covered with a material such as rubber having a high coefficient of friction so that slipping does not occur between the outer peripheral surface of the drive wheel 19 and the outer peripheral surface of the one end portion 21 of the shaft 2.

A displacement sensor 23 is positioned facing an outer peripheral surface of a portion near the tip of the other end portion 22 of the shaft 2 (right end portion in FIG. 1), for detecting radial deflection of the portion near the tip with rotation of the shaft 2, that is to say the presence of and amount of runout. Moreover the illumination portion of a laser projector 24 is positioned facing a portion near the base end of the other end 22, so that a portion on the outer peripheral surface near this base end of the other end 22 is heated by illumination from the laser beam.

A signal representing an amount of rotation (rotation angle) of the shaft 2 produced by the drive motor 20, and a signal representing the presence of and the amount of runout detected by the displacement sensor 23, are input to a controller 25. The controller 25 then outputs a signal to a drive circuit 26 for driving the laser projector 24, based on these signals input from the drive motor 20 and from the displacement sensor 23. Here the output signal from the displacement sensor 23 is first converted by a conversion circuit 27 to a signal representing the displacement amount, before outputting to the controller 25.

The operation using the above described construction to reduce or eliminate runout of the other end 22 of the shaft 2 constituting the rolling bearing unit is as follows.

Axial runout of the tip end of the other end portion 22 of the shaft 2 is detected by the displacement sensor 23 while rotating the shaft 2 (at low speed, or intermittently at small angular increments) by supplying power to the drive motor 20. Based on a signal representing the measurement results input from the displacement sensor 23 via the conversion circuit 27, and a signal representing the rotation angle of the shaft 2 input from the drive motor 20, the controller 25 outputs a signal to the drive circuit 26 of the laser projector 24. The drive circuit 26 then shines a laser beam onto the outer peripheral surface at a circumferential portion near the base end of the other end 22 of the shaft 2 to raise the temperature of this portion. When in this way, the portion of the shaft 2 becomes a high temperature due to the illumination from the laser beam, a change in structure occurs in this portion and the adjacent portions. Then based on this structural change, the area of the portion and the adjacent portions changes in volume (expands), so that the portion adjacent the base of the shaft 2 bends by the amount of this change. Therefore, if the bend direction and the bend amount of the portion adjacent the base end are controlled based on the signal representing the measurement results input from the displacement sensor 23 via the conversion circuit 27, and the signal representing the rotation angle of the shaft 2 input from the drive motor 20, then the axial runout of the tip of the other end 22 of the shaft 2 can be reduced or eliminated.

Figure 2:
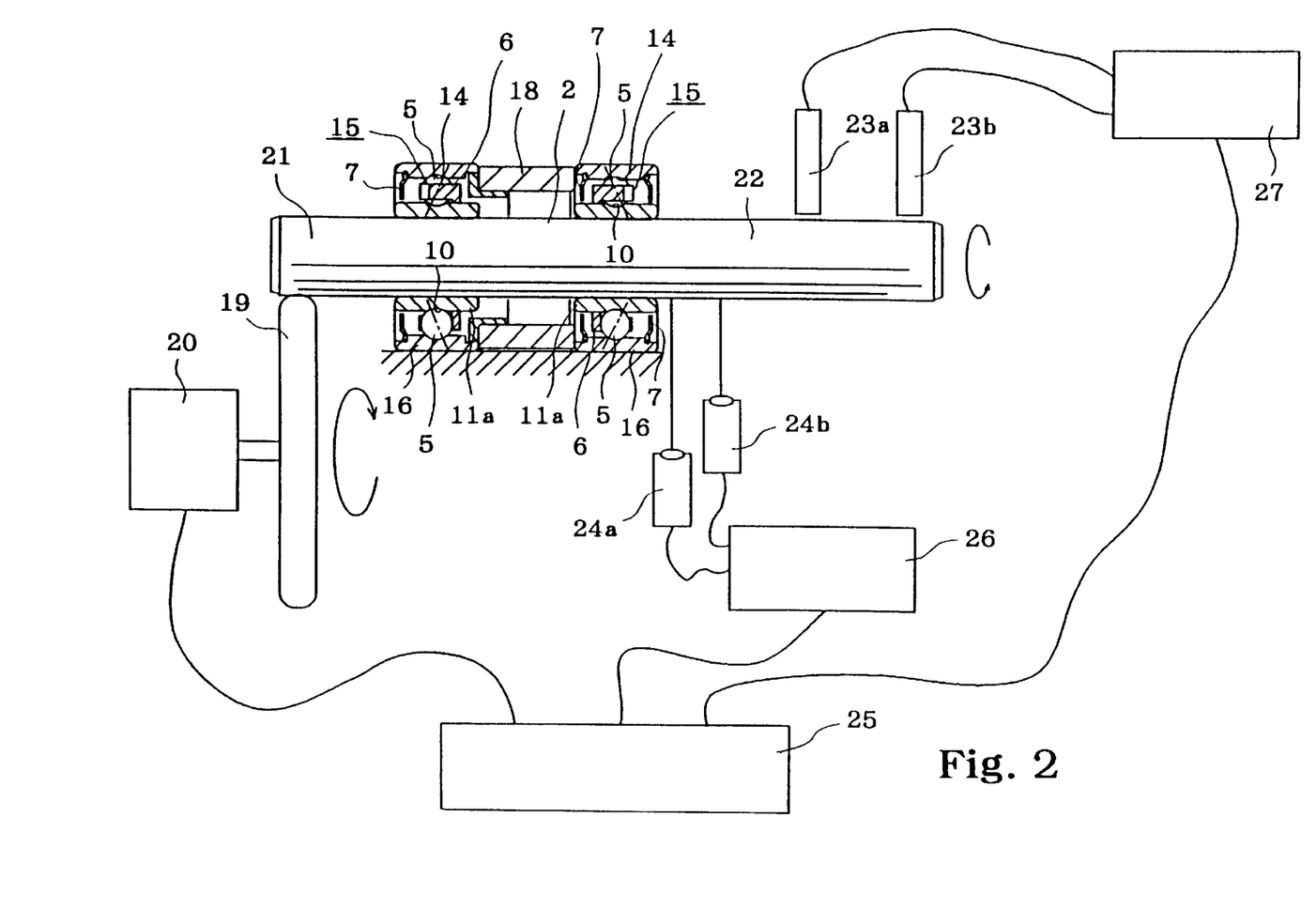
FIG. 2 is a cross-sectional view illustrating a second embodiment.

FIG. 2 shows a second example of an embodiment of the present invention. With this example, displacement sensors 23a, 23b are respectively positioned facing two locations axially apart from each other on a portion near the tip end of the other end 22 (right end in FIG. 2) of the shaft 2. With this example, by using the pair of displacement sensors 23a, 23b in this way, then it is possible to detect not only radial displacement of the portion near the tip end, accompanying rotation of the shaft 2, that is to say the presence of runout and the amount of this runout, but also whether or not the central axis of the portion near the tip end of the other end 22 of the shaft 2 is parallel with the center of rotation of the shaft 2, and if not parallel, to detect the direction of this central axis relative to the center of rotation. Moreover, the illumination portions of a pair of laser projectors 24a, 24b positioned at two axially apart locations are faced to a portion near the base end of the other end 22, so that two locations on the outer peripheral surface of the portion near the base end of the other end 22 are heated by the illumination of the laser beams. These two laser projectors 24a, 24b are driven independent of each other.

If the runout of the tip end of the other end 22 of the shaft 2 constituting the rolling bearing unit is reduced or eliminated using the above described apparatus, then the central axis of the tip end portion can be made to coincide with the center of rotation of the shaft 2. More specifically, in the case of the abovementioned first example, the portion near the base end of the other end 22 of the shaft 2 is bent at one location only. Therefore, a point on the central axis of the portion near the tip end of the other end 22 (the portion facing the displacement sensor 23) can be located on the center of rotation of the shaft 2. However, the central axis of the portion near the tip end (the geometric center) could not be made to coincide with the center of rotation of the shaft 2. On the other hand, with this second example, by bending two axially apart locations on one part of a portion near the base end of the other end 22 in different directions (for example in opposite directions), then it is possible to make the central axis of the portion near the tip end coincide with the center of rotation of the shaft 2 coincide.

Figure 3:
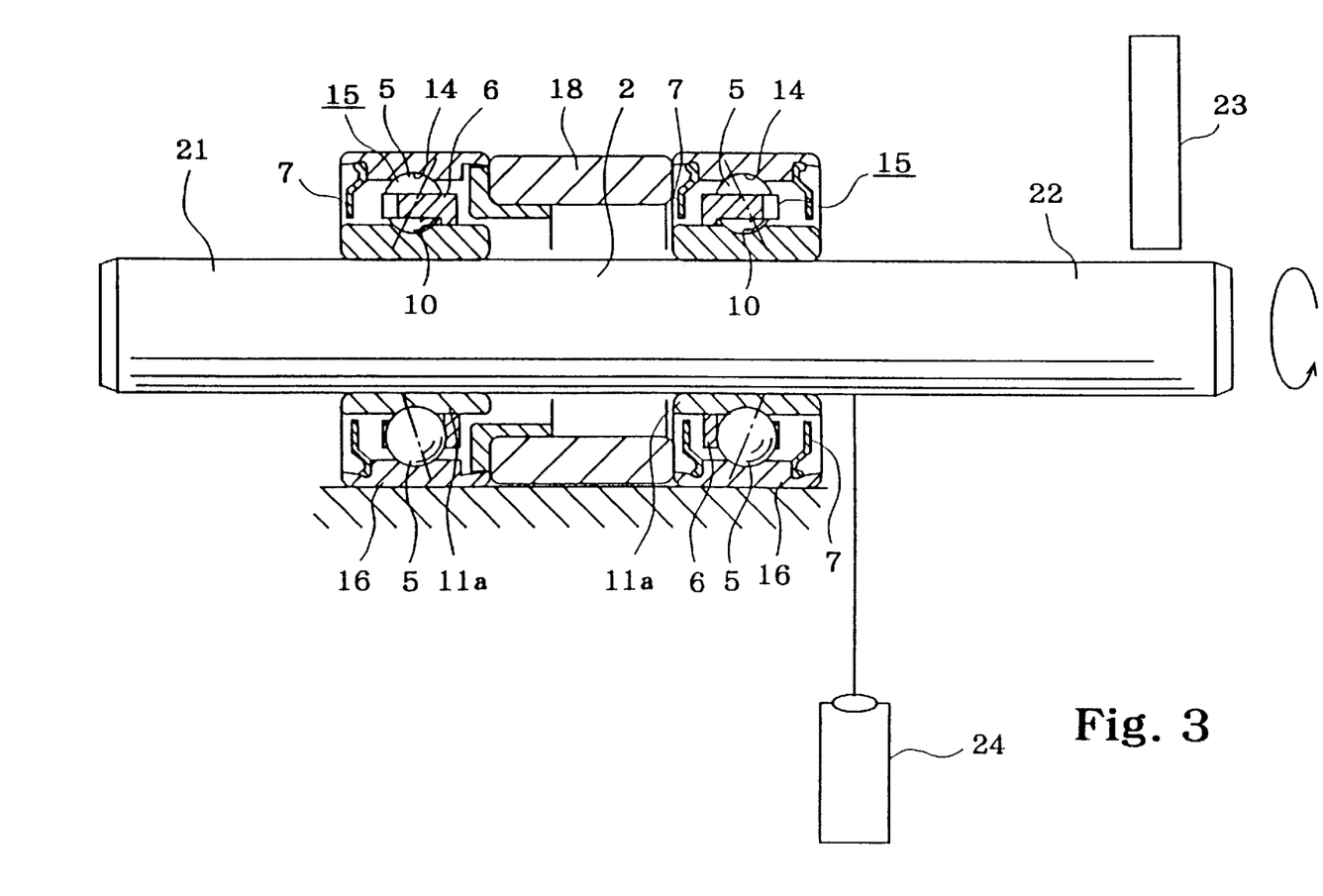
FIG. 3 is a cross-sectional view illustrating a third embodiment.
Figure 4:
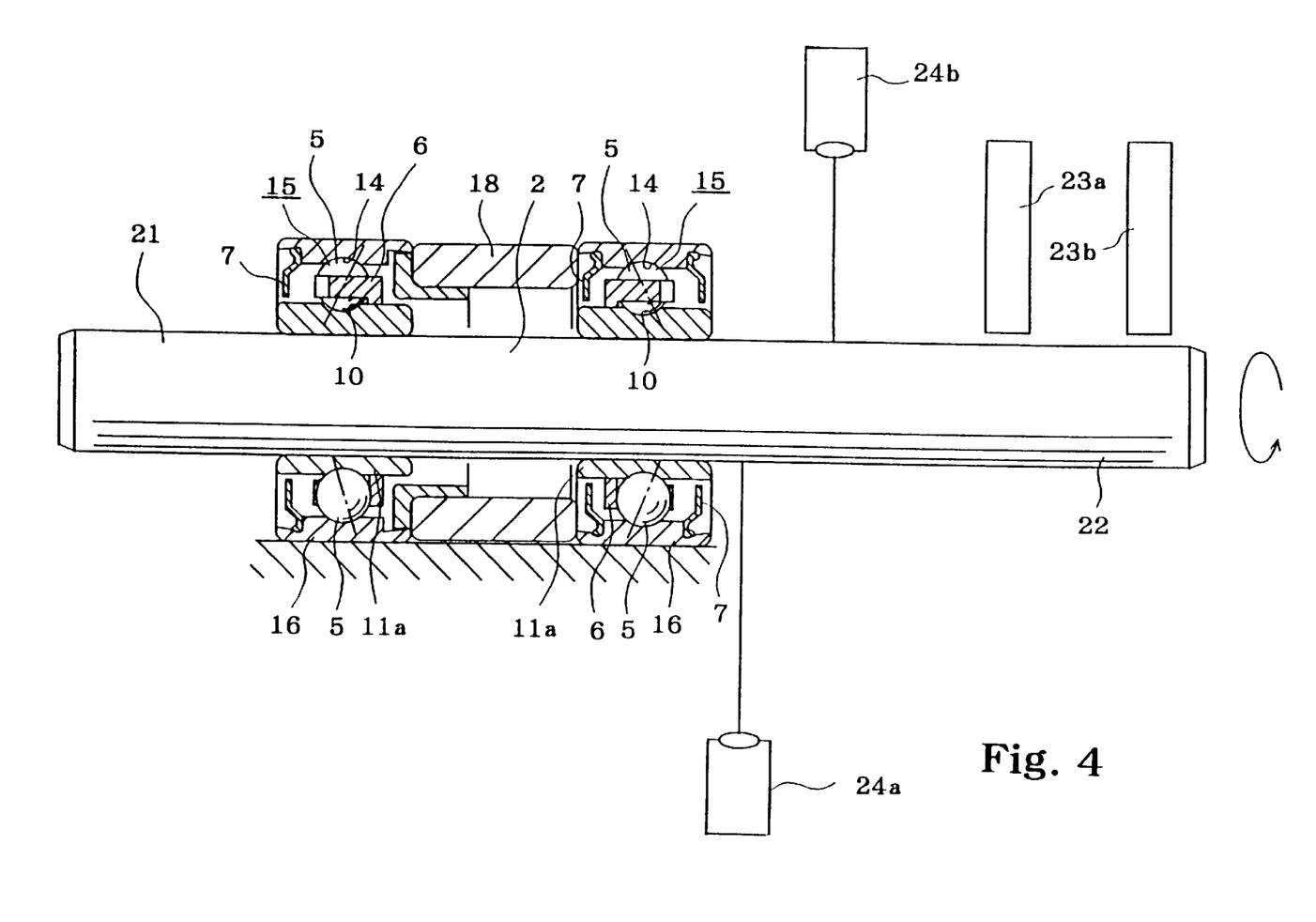
FIG. 4 is a cross-sectional view illustrating a fourth embodiment.

FIG. 3 and FIG. 4 show third and fourth examples of an embodiment of the present invention. These third and fourth examples illustrate a condition for correcting axial runout in the case where this occurs at the other end 22 of the shaft 2 due to a material eccentricity (the condition where the thickness around the periphery is uneven) of the inner rings 11a constituting the pair of ball bearings 15. The drive wheel, drive motor, controller, drive circuit, and conversion circuit are substantially the same as for the case of the first and second examples, and hence these are not shown in FIG. 3 and FIG. 4.

Again in the case where material eccentricity occurs in the inner rings 11a of a rolling bearing unit which is externally secured to the shaft 2 as described above, axial runout occurs at the tip end portion of the other end portion 22 of the shaft 2. With the method of reducing the axial runout of the rolling bearing unit according to the present invention, the axial runout due to this cause can also be reduced or eliminated as with the case of the first and second examples, by shining a laser beam on a portion near the base end of the other end 22 of the shaft 2 to slightly bend this portion near the base end.

In the above description, the description has been for the case where the invention is applied to a rolling bearing unit where the inner rings 11a are externally secured to the outer peripheral surface of the shaft 2 by an interference fit. The present invention is not however limited to this construction where the inner rings 11a are secured to the shaft 2 by this type of interference fit, and is also applicable to constructions where the inner rings 11a are secured by means of an adhesive. Furthermore, this is also applicable to the construction as shown in FIG. 7 where one inner ring race is formed directly in the outer peripheral surface of the shaft.

Due to the above described construction and operation for the method of reducing runout of a rolling bearing unit and a rolling bearing unit in which runout has been reduced, according to the present invention, the axial runout of the end portion of the shaft to which the inner ring is externally secured can be reduced to a negligible amount, so that even when the rolling bearing unit incorporating this shaft is rotated at a high speed, the occurrence of damaging vibration can be prevented. It is therefore possible to contribute to the high performance of VTR and HDD spindles and the like.

What is claimed is:

1. A method of reducing axial runout in a rolling bearing unit which comprises: a shaft having a cylindrical outer peripheral surface, at least one inner ring externally secured to the outer peripheral surface of said shaft to form an assembly with the shaft, such that a pair of inner ring raceways are formed on an outer peripheral surface of the assembly of the shaft and the inner ring, an outer ring located around the shaft and the inner ring and concentric with the shaft and the inner ring and having an inner peripheral surface formed with an outer ring raceway at locations facing the pair of inner ring raceways, and a plurality of rolling bodies provided so as to be freely rotatable between the outer ring raceways and the inner ring raceways, respectively, and being subjected to a pre-load, wherein the shaft assembled into the rolling bearing unit has an end portion which protrudes from said outer ring and is inclined to be displaced in the radial direction with rotation of the shaft, the method of reducing said axial runout comprised of the steps of measuring the radial displacement at the end portion of the shaft while the shaft is being rotated, and shining a laser beam, based on the measured results, on the outer peripheral surface of the end portion of said shaft at one portion around the circumference to raise the temperature at the one portion, thereby deforming the one portion so that said axial runout is reduced by this deformation.

2. A rolling bearing unit in which axial runout has been reduced, said rolling bearing unit comprising: a shaft having an end portion and a cylindrical outer peripheral surface, at least one inner ring externally secured to the outer peripheral surface of said shaft to form an assembly with the shaft, such that a pair of inner ring raceways are formed on an outer peripheral surface of the assembly of the shaft and the inner ring, an outer ring located around the shaft and the inner ring and concentric with the shaft and the inner ring and having an inner peripheral surface formed with outer ring raceways on the inner peripheral surface at locations facing the pair of inner ring raceways, and a plurality of rolling bodies provided so as to be freely rotatable between the outer ring raceways and the inner ring raceways, respectively, wherein said shaft runout is reduced by the steps of measuring axial runout at the end portion of the shaft while the shaft is being rotated, and based on the measured results, shining a laser beam on the outer peripheral surface of the end portion of said shaft at one portion around the circumference to raise the temperature at the one portion, thereby deforming the one portion so that said axial runout is reduced by this deformation.

* * * * *